US009810276B2

(12) United States Patent
Roberts (10) Patent No.: US 9,810,276 B2
(45) Date of Patent: Nov. 7, 2017

(54) DISC BRAKE ASSEMBLY (71) Applicant: Meritor Heavy Vehicle Braking Systems (UK) Limited, Cwmbran, Gwent (GB)

(72) Inventor: Paul Roberts, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 0 days.

(21) Appl. No.: 14/942,115

(22) Filed: Nov. 16, 2015

(65) Prior Publication Data

US 2016/0146278 A1 May 26, 2016

(30) Foreign Application Priority Data

Nov. 20, 2014 (EP) .................................... 14194060

(51) Int. Cl.
*F16D 65/097* (2006.01)
*F16D 55/226* (2006.01)
*F16D 65/00* (2006.01)

(52) U.S. Cl.
CPC ....... *F16D 65/0977* (2013.01); *F16D 55/226* (2013.01); *F16D 65/0006* (2013.01); *F16D 2250/0084* (2013.01)

(58) Field of Classification Search
CPC ............... F16D 65/097; F16D 65/0977; F16D 65/0006; F16D 65/0979
USPC ........................................... 188/73.37, 73.38
See application file for complete search history.

(56) References Cited

U.S. PATENT DOCUMENTS

| 3,937,304 | A | * | 2/1976 | Brix .................... F16D 65/0977 188/72.5 |
| 4,392,561 | A | * | 7/1983 | Watanabe ........... F16D 65/0977 188/73.36 |
| 4,677,420 | A | * | 6/1987 | Topic .................. F16D 65/0977 116/208 |
| 5,358,079 | A | * | 10/1994 | Brown ................ F16D 65/0977 188/73.36 |
| 5,947,234 | A | * | 9/1999 | Shimazaki ............ F16D 55/228 188/73.36 |
| 8,857,575 | B2 | | 10/2014 | Philpott |

(Continued)

FOREIGN PATENT DOCUMENTS

| DE | 102012011233 A1 | 12/2013 | |
| EP | 0794349 A2 * | 9/1997 | .......... F16D 55/228 |

(Continued)

OTHER PUBLICATIONS

European Patent Office, Extended Search Report for the corresponding European Patent Application No. 14194060.1 dated May 18, 2015.

*Primary Examiner* — Thomas J Williams
(74) *Attorney, Agent, or Firm* — Brooks Kushman P.C.

(57) ABSTRACT

A disc brake assembly arranged to be mounted over a rotor. The disc brake assembly includes first and second brake pads, a caliper having an opening for receiving the first and second brake pads, and a spring member for retaining the pads within the caliper. The spring member has a pad alignment feature arranged to prevent the spring member from being properly assembled on the caliper when one or more of the brake pads is inserted with its friction material facing away from a rotor receiving region of the caliper.

17 Claims, 5 Drawing Sheets (56) References Cited

U.S. PATENT DOCUMENTS

2004/0262099 A1* 12/2004 Crippa .................... F16D 55/22
                                                188/73.35
2005/0284710 A1* 12/2005 Roberts ................. F16D 55/226
                                                188/73.1

FOREIGN PATENT DOCUMENTS

| EP | 1610025 A1 | 12/2005 |
| EP | 2256360 A1 | 12/2010 |
| WO | 2013042062 A2 | 3/2013 |

* cited by examiner

DISC BRAKE ASSEMBLY

TECHNICAL FIELD

The present invention relates to disc brake assemblies for vehicles, such as lorries, trucks and the like.

BACKGROUND

Known disc brake assemblies include a caliper assembly, comprising a set of friction elements such as brake pads and a clamping frame, including one or more actuating elements, such as pistons, for clamping the pads against a rotor, all of which are mounted to a carrier. The carrier is typically fixed to a suspension component of the lorry or truck and the clamping frame, also termed in some cases a caliper, is slideably mounted on the carrier. The carrier has an inboard part and an outboard part connected via circumferentially spaced bridge arms (side beams), thereby defining an opening into which brake pads can be inserted and removed during servicing of the brake. The caliper, or clamping frame, similarly has an inboard part and an outboard part, again connected via circumferentially spaced bridge arms. The caliper creates a clamping force on the brake pads and as the brake pads engage the brake disc there is created a drag force which is reacted by the carrier. This translates to a braking force at the wheels of the vehicle, which can slow or stop its motion.

During assembly of brake pads into a caliper assembly, either on or off the vehicle, once brake pads have been inserted into the caliper assembly, a pad strap or pad retainer secures them in place relative to the carrier, so that the carrier prevents them from rotating relative to the vehicle. The pad strap or pad retainer generally engages separate spring members mounted to each of the brake pads so that the spring members bias the pads into the clamping frame and/or into the carrier to retain them in a substantially fixed rotational and radial position relative to the axle of the vehicle.

SUMMARY

According to the present invention there is provided a disc brake assembly comprising: a caliper arranged to be mounted over a rotor, the caliper having a rotor receiving region and an opening in which first and second brake pads are received on either side of the rotor receiving region; the disc brake assembly further comprising: a spring member arranged to provide a biasing force to each of the first and second brake pads, to retain them within the disc brake assembly; wherein the spring member comprises at least one pad alignment feature, the pad alignment feature being arranged to allow the spring member to be properly assembled on the assembly only when a corresponding one, preferably both, of the first and second brake pads is aligned with its friction material facing the rotor receiving region and when the brake pad further comprises a corresponding alignment feature arranged to engage the pad alignment feature of the spring member.

The assembly of the present invention therefore provides a single spring member which holds plural brake pads in place in the disc brake assembly and the spring member of the invention can also further be preferably configured so that if one or more, preferably both, of the brake pads is oriented with its friction material facing away from the rotor receiving region, the spring member cannot be properly assembled on the disc brake assembly. This can be achieved using a projecting portion of the spring member projecting into a recess on the brake pad, or vice versa, so that the projecting portion must be received in the recess to allow the pad and spring member to properly mate and to properly allow the spring member to be mounted to the pad and caliper assembly. The term caliper when used herein refers to a part of the assembly which is arranged to provide a clamping force to the brake pads to actuate the brakes. The caliper is generally assembled onto a camel* and limits and controls movement of the brake pads in an axial direction of the axis of rotation of the disc rotor. The carrier is attached to the vehicle, generally to axle components of the vehicle and retains the caliper in a fixed rotational position about the axis of the rotor relative to the vehicle, while allowing some axial movement to allow the clamping force of the caliper to be applied and released. The carrier can be an integral part of the brake assembly, a separate part which is attached to the vehicle during assembly of the vehicle, or can alternatively be an integral part of the axle, to which the caliper and brake pads are assembled during manufacture. The caliper can also be referred to as a clamping frame.

The alignment feature of the brake pad, or of each of the brake pads, is preferably circumferentially off-set from a center line of the pad, which is substantially radial with respect to a rotational axis of a rotor to which the disc brake assembly is to be applied. This circumferential off-set can further enable the feature to resist assembly of the spring member on the assembly by ensuring that a wrongly oriented pad does not present the necessary alignment feature when rotated around its central axis by 180 degrees.

The spring member preferably comprises a first pad alignment feature, off-set in a first direction to engage a pad profile feature of the first brake pad, and a second spring profile feature, off-set in a second direction, to engage a pad profile feature of the second brake pad. This can allow identical brake pads to be used in opposite facing orientations on either side of the caliper whilst still providing the orientation function.

The respective outer profiles of the first and second brake pads may therefore be substantially matching.

The spring member may be arranged to allow movement of at least one of the brake pads toward and away from the rotor, relative to the spring member, while maintaining the biasing force on the moving brake pad. This allows a single spring member to provide a biasing force to brake pads which are both moving and static, relative to the caliper.

The assembly may further comprise a retaining member, arranged to retain the spring member on the caliper. This can be a retaining strap or other retainer.

The spring member may comprise a retaining section for engaging the retaining member, so that the retaining member can retain the spring member in correct alignment on the caliper, to in turn retain the brake pads in correct alignment within the caliper.

The retaining section may comprise an alignment feature for engaging a corresponding orientation feature of the retaining member, to prevent the spring member from being assembled on the caliper in an incorrect alignment. The alignment feature can therefore be configured to prevent proper assembly of the spring member on the assembly if not in its correct orientation. Proper assembly refers to the spring member being contained within its normally assembled envelope so that other components, such as the retaining member, can be fixed into their normal operating positions. If the spring member prevents normal assembly of other components on the assembly, then an operator will be alerted to the fact that the spring member is not appropriately oriented and will adjust and correct its orientation until the retaining member can be assembled in its proper place.

The retaining section of the spring member may be a substantially central section and the spring member may further comprise resilient legs extending from the retaining section to provide the biasing force to the brake pads. This can allow efficient use of materials as compared to a spring member which is a single plate member and can further allow other components to be assembled or provided between the leg members.

The spring member may comprise at least two resilient legs arranged to engage each brake pad. This can provide a balanced force on each circumferential side of the individual pads.

The spring member may further comprise a shield portion arranged between at least one pair of the resilient legs, to substantially cover the pad-rotor interface in a region between the spring legs, to at least partially shield the pad-rotor interface from the surrounding environment.

The spring member may alternatively comprise a component retainer, arranged to retain a component, such as a sensor, a cable or a wear indicator. The component retainer may be detachably connected to the spring member. The spring member may therefore comprise a wear indicator retainer, arranged to retain a brake pad wear indicator adjacent the brake pads, the wear indicator retainer preferably being detachably connected to the spring member. These features, alone or in combination with any of the features of the assembly of the invention, can provide a more efficient way to retain a wear indicator on the assembly.

A further aspect of the invention provides a method of assembling brake pads into a disc brake assembly, comprising the steps of:

a) providing a caliper, preferably mounted over a rotor, the caliper having an opening in which first and second brake pads are received on either side a rotor receiving region;

b) providing a spring member arranged to provide a biasing force to each of the first and second brake pads, to retain them within the caliper; and c) assembling the spring member onto the caliper to retain the brake pads adjacent the rotor in the caliper;

d) wherein the spring member comprises at least one pad alignment feature, the pad alignment feature being arranged to allow the spring member to be properly assembled on the caliper only when a corresponding one of the brake pads is aligned with its friction material facing a rotor receiving region of the caliper and comprises a corresponding alignment feature arranged to engage the pad alignment feature of the spring member.

The method of the invention provides a better error-proofed method for assembling brake pads and a spring member onto a caliper, either before or after mounting the caliper to a rotor.

A further aspect of the invention provides a spring member for the brake pad assembly of the invention, comprising a pad alignment feature, the pad alignment feature being arranged to allow the spring member to be properly assembled on the caliper only when a corresponding one of the brake pads is aligned with its friction material facing a rotor receiving region of the caliper and comprises a corresponding alignment feature arranged to engage the pad alignment feature of the spring member.

The invention further provides a set of first and second brake pads for the assembly of claim 1, comprising a pad profile feature on at least one of the first and second brake pads, arranged to engage the pad alignment feature when the at least one brake pad is assembled with its friction material facing the rotor receiving region, to allow the spring member to be properly assembled onto the caliper.

Any or all of the above features of the invention can be combined in any combination to provide advantages which will become further apparent on reading the following detailed description.

BRIEF DESCRIPTION OF THE DRAWINGS

The invention will now be described, by way of example only, with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
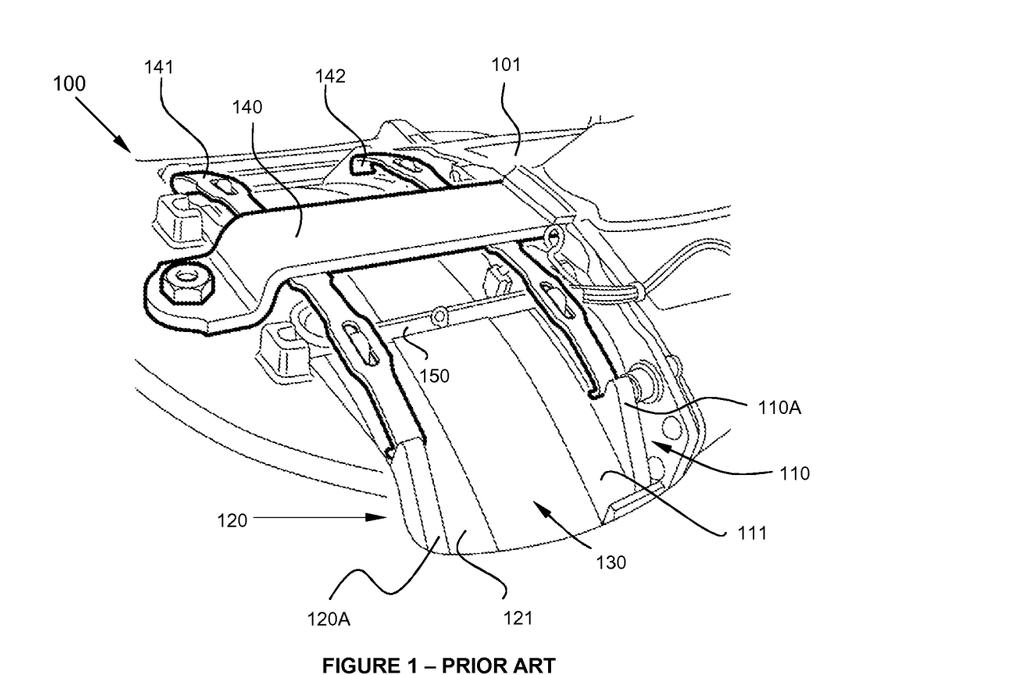
FIG. 1 is an isometric view of a disc brake assembly according to the prior art.

FIG. 1 shows a disc brake assembly 100 of the prior art. The disc brake assembly includes a caliper 101, into which brake pads 110 and 120 are received. The brake pads 110 and 120 comprise friction material 111 and 121, respectively, which is aligned facing a rotor receiving region 130, in which a rotor of a disc brake is received when the disc brake assembly 100 is mounted to a carrier to retain it in fixed rotational arrangement relative to the vehicle, over the disc brake rotor, to form a braking assembly. The friction material of each pad is mounted to a back plate 110A and 120A, respectively. The brake pads 110 and 120 are retained within the caliper 101 by a retaining arrangement. The retaining arrangement comprises a retaining member 140 and separate spring members 141 and 142. Each spring member 141 and 142 is retained in a compressed state between the retaining member 140 and the brake pads 110 and 120, to bias the brake pads 110 and 120 into the caliper 101. The caliper 101 therefore comprises an opening, which comprises a rotor receiving region 130 and is also configured to receive brake pads 110 and 120 on either side of the rotor. This arrangement retains the brake pads in place on the carrier, and retains the pads in the caliper 101. The construction of the caliper and carrier is described in more detail in relation to FIG. 2. A pad wear warning indicator device 150 is also included and is shown in more detail in FIG. 4.

Figure 2:
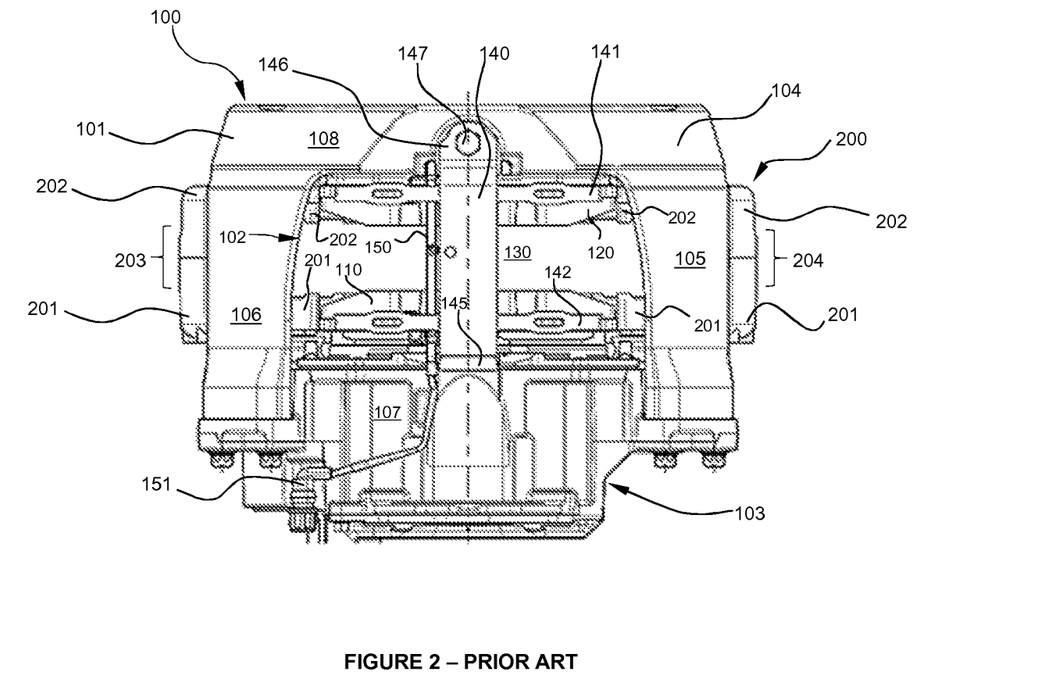
FIG. 2 is a plan view of the prior art disc brake assembly of FIG. 1.

FIG. 2 shows a plan view of the disc brake assembly of FIG. 1. As can be seen more clearly in FIG. 2, the caliper 101 includes an opening 102, into which the pads 110 and 120 can be inserted on either side of a rotor receiving region 130. The caliper, which can also be termed a clamping frame, comprises a pair of bridge sections 105 and 106, which are arranged to extend across the plane of the rotor when assembled on the rotor. The caliper also comprises a housing section 107, which houses actuation elements for driving the brake pads against the rotor, such as pistons. The housing section 107 can be formed integrally with, or as a separate component from, the bridge sections 105 and 106. A reaction portion 108 is arranged opposite the housing 107 to react forces of the drive elements in the housing 107 to clamp the brake pads on to the rotor during braking. The opening 102 is surrounded by the bridge sections 105 and 106 and the housing 107 and reaction portion 108. The caliper or clamping frame 101 is mounted to the carrier 200. The carrier has an inboard part 201 and an outboard part 202, in which the brake pads 110 and 120 are received and then held in place by the caliper assembly as described in the following. The carrier also has carrier bridge sections 203 and 204, which span the rotor when assembled on the axle, over the rotor. The pads 110 and 120 are retained to the carrier via a retaining arrangement connected to the caliper 101 as follows. The spring members 141 and 142 can be clipped to the pads and inserted with the pads, or alternatively can be added after the pads have been inserted into the rotor receiving region 130 in the caliper 101. Retaining member 140 is held in place at a first end 145 by a cantilever or hook arrangement, so that the first end 145 can be inserted into a recess or receiving region on the caliper 101, while a second end 146 is held in place on the caliper 101 by releasable retaining means, such as a nut, bolt or screw, 147. Removal and replacement of the brake pads 110 and 120 can therefore be relatively easily carried out, by releasing the screw, nut or bolt 147, removing the retaining member 140, releasing the pad wear warning indicator device 150 from the pads, or otherwise disconnecting the pad wear warning indicator connector 151. Subsequently, the pads can be extracted from the caliper 101 through the opening 102. The caliper includes an actuator side 103, which includes one or more actuators for driving the actuator side brake pad 110 toward the non-actuator side brake pad 120. The caliper therefore also has a non-actuator side 104.

Figure 3:
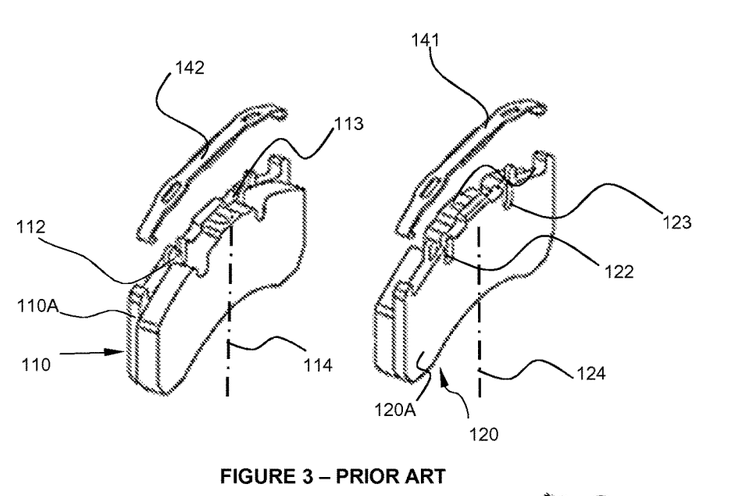
FIG. 3 shows brake pads and spring members of the disc brake assembly of FIGS. 1 and 2.

FIG. 3 shows the brake pads 110 and 120 removed from the caliper 101, and the pad spring members 141 and 142 are shown removed from the brake pads.

Figure 4:
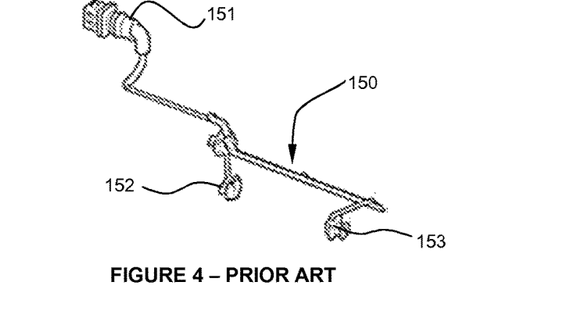
FIG. 4 shows a pad wear indicator arrangement of the invention.

FIG. 4 shows greater detail of the pad wear warning indicator 150, which can be attached to the brake pads with its attachment portions 152 and 153. These can be clipped onto the back plates of the brake pads 110 and 120 at the wear indicator attachment points 112, 113, 122 and 123. The warning indicator may also be attached to the caliper for support on its length in addition to the support at its ends.

It is generally preferable that brake pads 110 and 120 are substantially identical, so that it is only necessary for a manufacturer of new brake pads, or of replacement brake pads, to create a brake pad of a single form, which can be used on either side of the caliper 101 and carrier 200. For this reason, two separate wear indicator receiving portions are provided on each brake pad, and the brake pads are substantially symmetrical around a central axis, preferably an axis of substantial symmetry 114 and 124 shown in FIG. 3.

It can, in certain braking assemblies and in certain circumstances, remain a possibility that, due to an error of a person maintaining or assembling the braking assembly, one or more of the brake pads is inserted in the caliper in the wrong orientation, with its friction material 111 or 121 facing away from the rotor, and with the back plate 110A or 120A facing the rotor. If the brakes are actuated during movement of a vehicle to which the assembly is mounted in this situation, then this may lead to excessive brake noise, thermal damage and/or incorrect braking performance.

The arrangement of the present invention seeks to prevent completion of assembly of the brake disc assembly when brake pads are not assembled in the correct orientation.

FIGS. 5 to 10 show novel aspects of a brake pad retaining arrangement for use with a caliper as shown in FIGS. 1 and 2.

Figure 5:
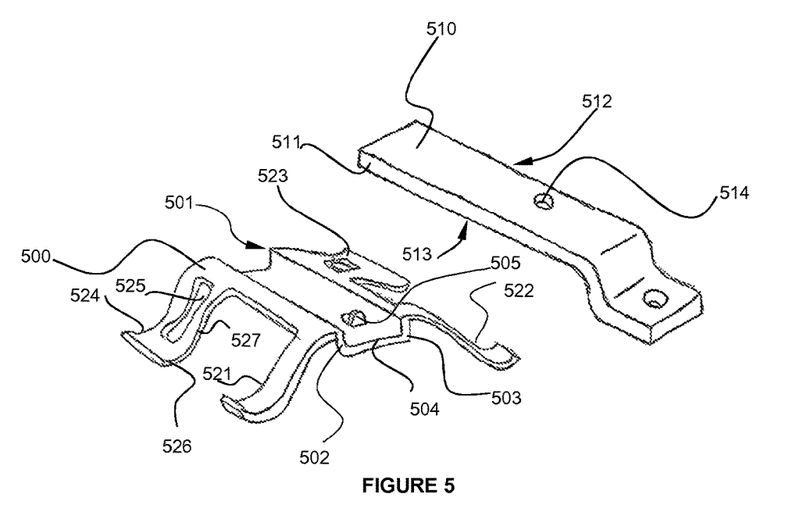
FIG. 5 shows a spring member and a retaining member of the invention.

It will be appreciated in the description of FIG. 5 and the following Figures, that although numerals are used to refer to the prior art arrangements shown in FIGS. 1 to 4, certain changes are necessary to the elements of that arrangement in accordance with the invention as described herein. In particular, preferably the retaining member 510, the spring member 500 and the pads 110 and 120 are modified as compared to those shown in FIGS. 1 to 4, as will become apparent on reading this and the following description.

FIG. 5 shows a spring member 500 according to the invention. The spring member 500 has a retaining section 501, which is configured to engage a retaining member 510 which retains the spring member 500 on a caliper. The retaining member 510 is attached to the caliper 101 in the same way as is illustrated for retaining member 140 in FIG. 2. The retaining section 501 of the spring member 500 may comprise a channel or gully having one or more side walls 502 and 503, located either side of a bottom wall 504. The side and/or bottom walls can therefore engage with the retaining member 510 on its respective side walls 511 and 512 and its bottom side 513. The substantially linear interfaces between the retaining member 510 and the spring member 500 help to align the spring member 500 with respect to a rotational axis of a rotor over which the caliper is mounted (not shown). These features help to orientate a lateral axis of the spring member in alignment with an axis which is substantially perpendicular to the planes of brake pads such as brake pads 110 and 120 shown in FIGS. 1 to 3. The retaining member 510 and the spring member 500 can be provided with alignment and orientation means in the form of an opening 514 provided in the retaining member 510 and a corresponding protrusion 505 provided on the spring member. These corresponding orientation means are provided offset horn a point of rotational symmetry of the spring member, so that the protrusion 505 must engage with the opening 514 in order for the retaining member 510 to be correctly assembled onto the caliper with the spring member 500 in place. It will, of course, be appreciated that the opening 514 may be provided on the spring member 500 and the protrusion 505 may be conversely provided on the underside of the retaining member 510 as viewed in the Figure. This arrangement including an orientation feature provides a type of poka-yoke or error-proofing feature to avoid assembly errors which can result in the spring member 500 being assembled in an incorrect orientation with respect to the caliper.

It can further be seen in FIG. 5 that the spring member 500 comprises a central region, from which a plurality of resilient leg members 521, 522, 523 and 534 extend.

Legs 521 and 522 are arranged to extend longitudinally along a plane of the back plate 120A of the brake pad, to provide a biasing force at spaced locations on the brake pad back plate 120A, in a similar manner to that shown for spring members 141 and 142 in FIG. 3. Leg members 521 and 522 have a width which is substantially similar to a width of the back plate 120A of a brake pad. These legs are arranged to be located at the non-actuator side of the caliper, since there is no relative movement between the caliper and the back plate of the brake pad 120 at that non-actuator side 104 of the caliper 101.

Leg members 523 and 524 are also arranged to extend from the central portion of the spring member in a longitudinal manner along a plane of brake pad 110. These legs are arranged to provide a biasing force at spaced locations on the back plate 110A of a brake pad of the disc brake assembly. However, on the actuator side 103 of the caliper 101, there is relative movement between the brake pad 110 and the caliper 101. The spring member 500 will be in a fixed lateral location relative to the caliper, since it is retained in place by the retaining member 510 and the corresponding location and orientation features, protrusion 505 and opening 514, so there will be relative movement between brake pad 110 and spring member 500. For this reason, resilient leg members 523 and 524 have a width which is greater than the width of legs 521 and 522. This is so that as the friction material 111 or brake pad 110 wears and causes the relative position of brake pad 110 and spring member 500 to change, the legs 523 and 524 can still apply a biasing force to the pad 110 to bias it into the caliper 101.

Legs 523 and/or 524 may be provided with an opening 525, so that the leg has an overall width or resilient material, which may be configured to be similar to the overall width of legs 521 and 522. This means that even though the leg has a wider pad contact region 526, the overall biasing force created by the extending part 527 of the leg is similar to that, or the same as that, provided by legs 521 and 522. This helps to create a balanced biasing force of pads on both sides of the rotor receiving region 130 of the caliper 101.

Figure 6:
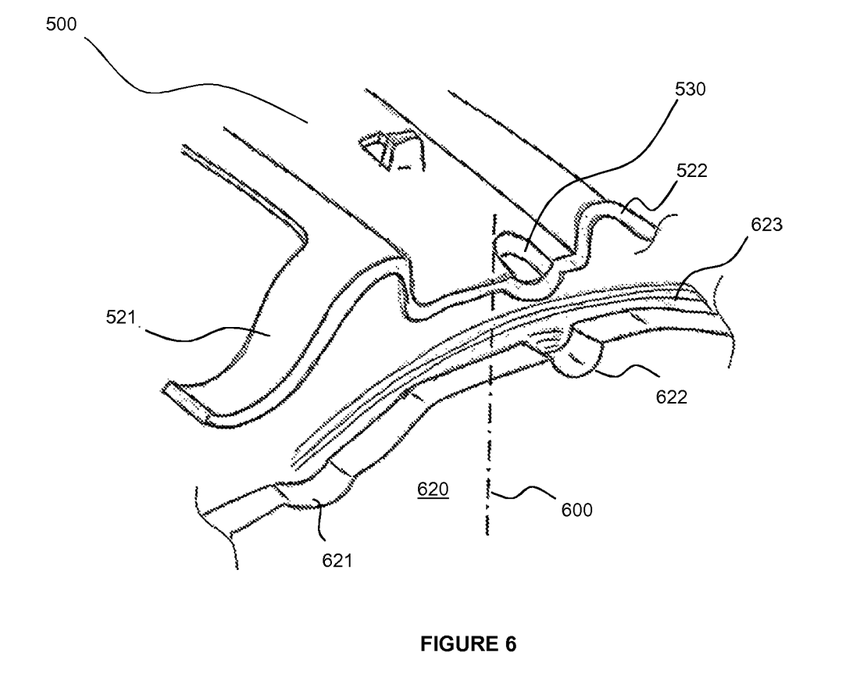
FIG. 6 shows a detailed view of the interface between the spring member and brake pad of the invention.

FIG. 6 shows further detail of an interface between a brake pad 620 and the spring member 500. Brake pad 620 has been modified with respect to brake pads 110 or 120, as described in the following.

The brake pad 620 is provided with a number of features around its outer profile, which is the outer edge of the back plate. The outer profile is provided with one or more spring end locating features 621, for locating the distal ends of the legs 521 and 522 of the spring member 500. Further, the outer profile is provided with a pad alignment feature 622, which is configured to engage with a corresponding pad alignment feature 530 of the spring member 500. The corresponding pad alignment feature 622 and 530 of the pad 620 and the spring member 500, respectively, are offset from a substantially central line 600, optionally a line of substantial symmetry, of the pad 620. This means that the orientation features 622 in the outer profile of the pad 620 only engages correctly with the pad alignment feature 530 of the spring member 500 when the pad 620 is correctly oriented with its friction material 623 correctly facing inwardly toward the rotor receiving region 130 of the caliper 101.

Figure 7:
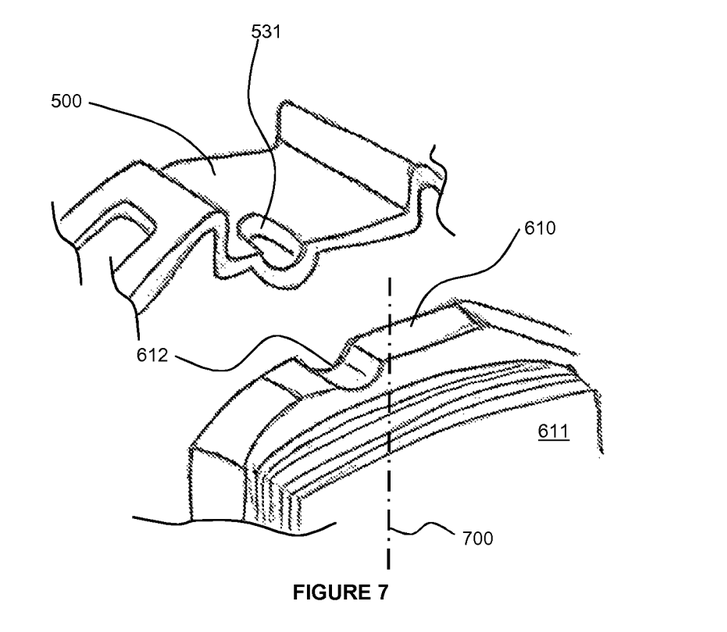
FIG. 7 shows further detail of the spring member to brake pad interface of the invention.

While FIG. 6 shows the outboard, or non-actuator side brake pad interface with the spring member 500, FIG. 7 shows the inboard, or actuator-side brake pad interface with the spring member 500. FIG. 7 shows a section cut through the spring member 500. Here it can be seen that when the pad 610 is located on the inboard or actuator side of the caliper, the orientation feature 612 in the outer profile of the pad back plate is located to the opposite side of a center line 700 (which is optionally a line of substantial symmetry of the brake pad) with respect to the offset shown in FIG. 6. The use of same or similar brake pads on opposite sides of the caliper therefore can result in the orientation feature 612, 622, being offset in opposite directions on either side of the rotor receiving region 130. Accordingly, the spring member 500 has a further pad alignment feature 531, offset from the center line 700 of the pad 610 in an opposite direction to that shown in FIG. 6. In this way, when the inboard or actuator side pad 610 is correctly oriented with its friction material 611 facing the rotor receiving region 130, then the orientation feature 612 of the pad correctly engages the pad alignment feature 530 of the spring member 500. Conversely, if the pad 610 is inserted in the opposite orientation, with its friction material 611 facing away from the rotor receiving region 130, then the pad alignment feature 612 will be located to the opposite side of center line 700 to that shown in FIG. 7 and so the pad alignment feature 530 will simply abut the flat surface of the outer profile of the brake pad 610. This will prevent the spring member 500 from being correctly located on the caliper 101, due to the obstruction created by the pad alignment feature 530 against the flat outer profile of the pad 610. These corresponding orientation features 612 and 531 and 622 and 530 can therefore create an error-proofing or poka-yoke function to prevent assembly of the disc brake assembly with the brake pads in an incorrect orientation.

Figure 8:
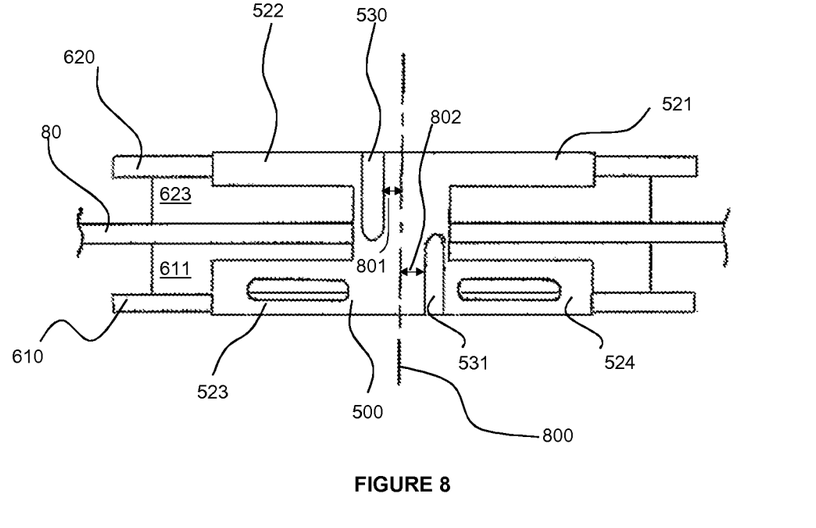
FIG. 8 shows a plan view of the spring member and brake pad arrangement of the invention.

FIG. 8 shows a schematic plan view of the spring member 500 of the invention, assembled over pads 610 and 620, with the rotor 80 located in between the friction material 611 and 623 of the respective brake pads. As can be seen in the Figure, to prevent the assembly of the brake pads and spring member in the caliper (not shown in FIG. 8) the pad alignment features 530 and 531 of the spring member 500 can extend laterally, substantially perpendicularly to the plane of the back plates of the pads toward the rotor 80, so that if the pad 620 or 610 is inserted in the incorrect orientation, its surface will engage the pad alignment feature 530 or 531 at a point substantially in line with the surface of the rotor 80, since that is where the back plate would be located if the pads are inserted the wrong way around. The respective offsets relative to a substantial center line 800 of the brake pad 610 and 620 can also be seen and these schematically represented offsets 801 and 802 will in practice be substantially the same to allow substantially identical brake pads to be used on either side of the rotor 80.

As well as helping to ensure correct orientation of the brake pads in the caliper, the pad alignment features described above also help to ensure that the correct pads are used with the correct spring members. For example, if an incorrect pad, without the correct pad alignment feature 612 or 622 present is assembled in the caliper, then the spring member will still be prevented from being properly assembled on the caliper, since in the absence of the orientation feature 612 or 622, it will not properly engage with the pads and so will be prevented from aligning snuggly with them and the retaining member 510 will also not be properly mountable to the caliper. Similarly, if an incorrect spring member is chosen and an attempt is made to mount it to the pads, if the spring member has the orientation features 530 and 531 in the incorrect locations, they will not properly engage with the orientation features 612 and 622 of the brake pads and so they will therefore be prevented from proper assembly onto the caliper. This can therefore help to ensure that correct pads are used on a correct caliper with a correct spring member.

An example of orientation features 531 and 530 and their corresponding features 612 and 622 are illustrated in the Figures. However, it will be appreciated that their configuration could be reversed in certain embodiments. For example, the profile feature 622 could be a protrusion rather than inclusion as shown in the Figures, and a corresponding inclusion could he provided on the spring member, either by reduction in its thickness, or by embossing it in an opposite direction to that shown in FIG. 6. In this case, it may be necessary to provide a corresponding inclusion on retaining member 510, which would further help to ensure that the correct retaining member 510 is used with the pads and spring member 500. The illustrated embodiment therefore shows a substantially circular indentation on the outer profile of the back plate of the brake pads 610 and 620. However, the indentation could take other forms, with substantially straight rectilinear edges, angled edges and other types of curves, as can be envisaged in light of the disclosure herein. The pad alignment features could also be provided on one or more of the legs of the spring member and in corresponding locations on the brake pads instead of at the central region of the spring member as illustrated.

Figure 9:
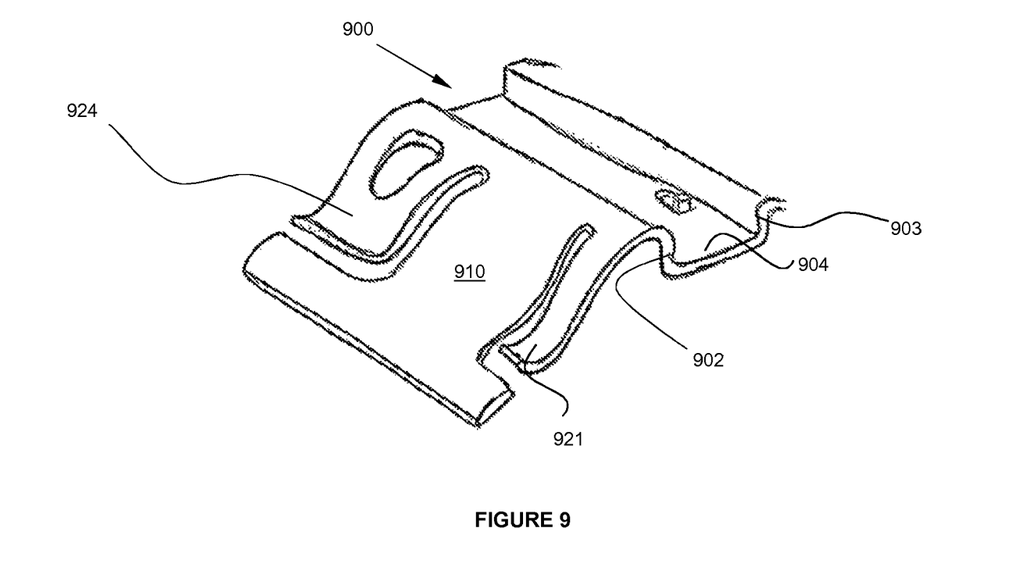
FIG. 9 shows an optional guard element included on the spring member of the present invention.

FIG. 9 shows a further alternative arrangement of the spring member 500. A spring member 900 is shown, which is substantially the same as the spring member 500 of the earlier embodiments. However, in addition to the resilient leg members 924 and 921, there is provided a pad shield, preferably a pad and rotor shield, 910, which is provided in the form of a sheet extending laterally between the legs 921 and 924 and substantially in the same plane as those legs. This pad shield 910 can act to reduce or restrict the ingress of dirt, liquids and other contaminants to the pad-rotor interface below the spring member and can also reduce the expulsion of braking dust from within the caliper. This can reduce the contamination of surrounding components with brake dust created by wear of friction material of the pads.

The spring member 500 or 900 can be stamped or cut out from a single sheet and formed to have the necessary profile of the central channel section, with its side walls 902 and 903 and its bottom surface 904. The form of the resilient leg members can also be formed from the same sheet. This can lead to the efficient and effective manufacture of a spring member for use in the braking assembly of the invention.

Figure 10:
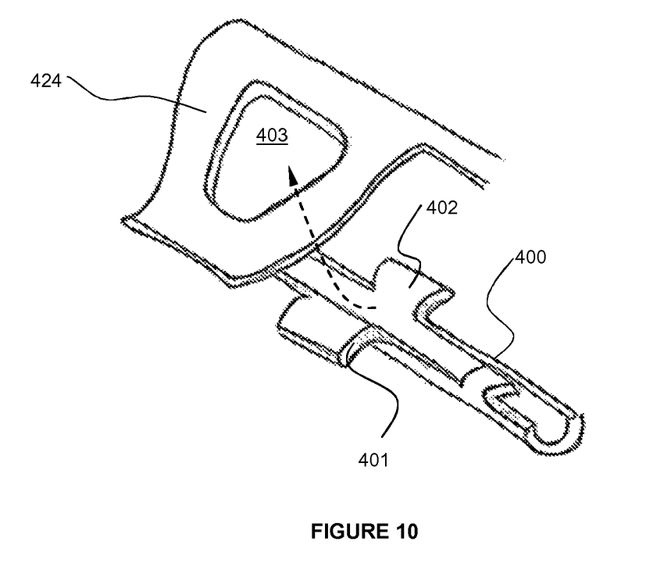
FIG. 10 shows detail of an optional mounting arrangement of the present invention for mounting a pad wear indicator.

A further alternative feature of the spring member of the invention is shown in FIG. 10. The spring member 400 has a leg 424, which is the same or similar to the leg 924 or 524 illustrated in the inner embodiments. A wear indicator retainer 400 is provided and comprises engagement means 401 and 402 for engaging the opening 403 in leg 424. In this way, the wear indicator retainer 400 can be used to retain a wear indicator, such as the wear indicator 150 illustrated in FIGS. 1, 2 and 4 of the earlier description, and can optionally be removably retained in the leg 424 of the spring member 400, which can be the spring member 500 or 900 described in relation to the earlier embodiments. Attaching the wear indicator to the spring member in this way, removes the need to provide any means for attaching the wear indicator to parts of the caliper or to any parts of the actuator housing of the caliper. This can reduce the complexity and resulting cost of manufacture of components of the brake disc assembly and can also facilitate easier maintenance operations, as fewer steps can be implemented to remove the spring member and the wear indicator together as a single assembly during maintenance of the disc brake assembly. The opening can be provided in others regions of the spring member such as the central retaining portion.

Although the invention has been described above with reference to one or more preferred embodiments, it will be appreciated that various changes or modifications may be made without departing horn the scope of the invention, as defined in the appended claims. It will also be apparent that features of these different embodiments can be combined both with one another and also with features of the prior art arrangements described herein in order to achieve the advantages of the invention.

What is claimed is:

1. A disc brake assembly comprising:
   first and second brake pads that each have a friction material and an alignment feature;
   a caliper arranged to be mounted over a rotor, the caliper having a rotor receiving region and an opening in which first and second brake pads are received on either side of the rotor receiving region; and
   a spring member that exerts a biasing force against the first and second brake pads to retain them within the caliper;
   wherein the spring member has a pad alignment feature arranged to allow the spring member to be properly assembled on the caliper only when a corresponding one or both of the brake pads is/are aligned with its friction material facing the rotor receiving region of the caliper and when the alignment feature is arranged to engage the pad alignment feature of the spring member and the pad alignment feature is disposed in a central region of the spring member that extends from the first brake pad to the second brake pad.

2. The disc brake assembly of claim 1 wherein the alignment feature of at least one of the first and second brake pads is circumferentially offset from a center line of at least one of the first and second brake pads, wherein the center line is substantially radial with respect to a rotational axis of the rotor to which the disc brake assembly is to be applied.

3. The disc brake assembly of claim 2 wherein the spring member further comprises a first pad alignment feature that is offset in a first direction to engage a pad profile feature of the first brake pad, and a second spring profile feature that is offset in a second direction to engage a pad profile feature of the second brake pad.

4. The disc brake assembly of claim 1 wherein outer profiles of the first and second brake pads are substantially matching.

5. The disc brake assembly of claim 1 wherein the spring member is arranged to allow movement of at least one of the first and second brake pads toward and away from the rotor, relative to the spring member, while maintaining the biasing force on the moving brake pad.

6. The disc brake assembly of claim 1 further comprising a retaining member arranged to retain the spring member on the caliper.

7. The disc brake assembly of claim 6 wherein the spring member further comprises a retaining section that engages the retaining member so that the retaining member retains the spring member in correct alignment on the caliper, to in turn retain the first and second brake pads in correct alignment within the caliper.

8. The disc brake assembly of claim 7 wherein the retaining section further comprises an alignment feature that engages a corresponding orientation feature of the retaining member to prevent the spring member from being assembled on the caliper in an incorrect alignment.

9. The disc brake assembly of claim 7 wherein the retaining section is a substantially central section and the spring member further comprises resilient legs extending from the retaining section to provide the biasing force to the first and second brake pads.

10. The disc brake assembly of claim 9 wherein the spring member further comprises at least two resilient legs arranged to engage the first brake pad and at least two resilient legs arranged to engage the second brake pad.

11. The disc brake assembly of claim 10 wherein the spring member further comprises a shield portion arranged between at least one pair of the resilient legs to substantially cover a pad-rotor interface in a region between the resilient legs, to at least partially shield the pad-rotor interface from a surrounding environment.

12. The disc brake assembly of claim 1 wherein the spring member further comprises a component retainer, arranged to retain a component brake pad wear indicator adjacent the first and second brake pads, the component retainer being detachably connected to the spring member and arranged to retain the wear indicator.

13. A method of assembling brake pads into a disc brake assembly, comprising the steps of:
   a) providing a caliper mounted over a rotor, the caliper having an opening in which first and second brake pads are received on either side of a rotor receiving region;
   b) providing a spring member arranged to provide a biasing force to each of the first and second brake pads to retain them within the caliper; and
   c) assembling the spring member onto the caliper to retain the brake pads adjacent the rotor receiving region in the caliper;
   d) wherein the first and second brake pads each have an alignment feature and wherein the spring member comprises at least one pad alignment feature, the pad alignment feature being arranged to allow the spring member to be properly assembled on the caliper only when a corresponding one of the first and second brake pads is aligned with its friction material facing the rotor receiving region of the caliper and when a corresponding alignment feature is arranged to engage the pad alignment feature of the spring member and the pad alignment feature is disposed in a central region of the spring member that extends from the first brake pad to the second brake pad.

14. A spring member for biasing a brake pad against a caliper, the spring member comprising:
   a central region having first and second pad alignment features that are offset with respect to each other and with respect to a center line of the central region;
   a first pair of resilient legs that are spaced apart from each other and extend from the central region in a first direction; and
   a second pair of resilient legs that are spaced apart from each other and extend from the central region in a second direction disposed opposite the first direction.

15. A set of brake pads comprising:
   a first brake pad having a first back plate having an outer profile that has a first spring end locating feature and a first friction material disposed on the first back plate, wherein the first spring end locating feature is a recess that extends toward the first friction material; and
   a second brake pad having a second back plate having an outer profile that has a second spring end locating feature and a second friction material disposed on the second back plate, wherein the second spring end locating feature is a recess that extends toward the second friction material;
   wherein the first spring end locating feature is offset from the second spring end locating feature when the first brake pad and the second brake pad are aligned with each other along a center line and the first back plate is disposed substantially parallel to the second back plate.

16. A brake pad and spring member arrangement comprising:
   a first brake pad that has a first back plate that has a first spring end locating feature;
   a second brake pad that has a second back plate that has a second spring end locating feature; and
   a spring member that has a central region that has a first pad alignment feature that is received in the first spring end locating feature and a second pad alignment feature that is received in the second spring end locating feature, wherein the first and second pad alignment features are offset with respect to each other and with respect to a center line of the central region.

17. The brake pad and spring member arrangement of claim 16 wherein the spring member further comprises:
   a first pair of resilient legs that are spaced apart from each other and extend from the central region to the first brake pad; and
   a second pair of resilient legs that are spaced apart from each other and extend from the central region to the second brake pad.

* * * * *